Oct. 20, 1931.  G. W. WHITE  1,828,517
FLUSH VALVE
Filed Nov. 20, 1924
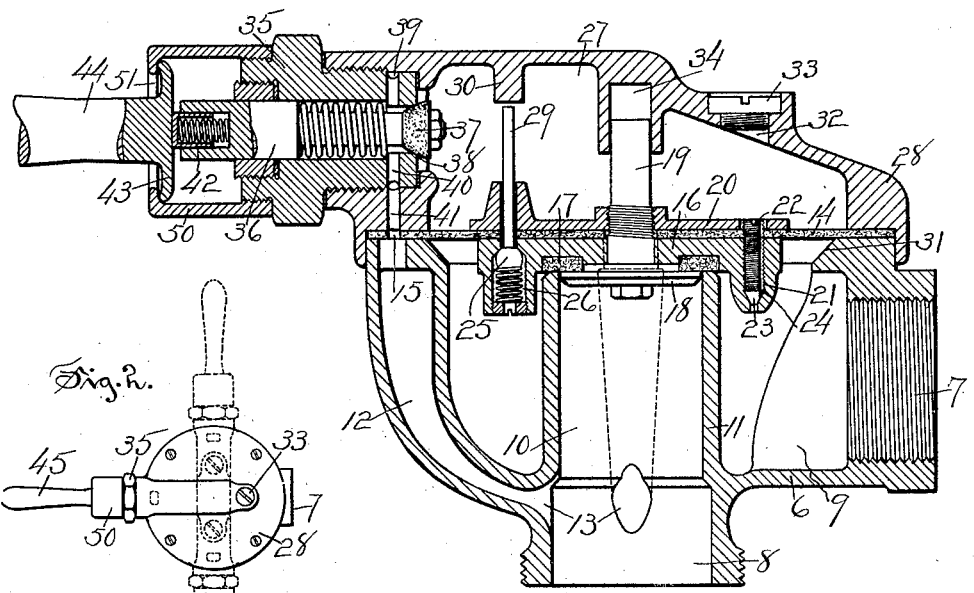
INVENTOR
Gordon W. White,
by
Arthur B. Jenkins,
ATTORNEY Patented Oct. 20, 1931

1,828,517

UNITED STATES PATENT OFFICE

GORDON W. WHITE, OF WEST HARTFORD, CONNECTICUT

FLUSH VALVE

Application filed November 20, 1924. Serial No. 751,136.

My invention relates more especially to that class of valves that is employed for flushing purposes in connection with water closets and the like, and an object of my invention, among others, is the production of a valve of this type that shall be simple in construction, and effective in operation; and another object of my invention is to provide a valve of this type that may be installed in various positions without obstruction to its operation by reason of the proximity of walls or other structures; and a further object of the invention is the provision of a valve of this type that may be readily adjusted for effective operation under various conditions.

One form of valve embodying my invention, and in the construction and use of which the objects herein set out, as well as others, may be attained is illustrated in the accompanying drawings, in which—

Figure 1 is a view in central section through a valve embodying my invention.

Figure 2 is a diagrammatical view illustrating in full and in dotted lines the different positions to which the cap may be adjusted to avoid interference in its operation.

Figure 3 is a detail view in central section through a portion of a valve illustrating a slightly different form of construction.

Figure 4 is a view similar to Figure 3, but illustrating another form of structure.

Figure 5 is a view similar to Figure 2, but illustrating the positions to which the cap of the structure shown in Figures 3 and 4 may be placed.

In the accompanying drawings the numeral 6 indicates the body of my improved valve that may be of any suitable material and that has an inlet opening 7 constructed for attachment to an inlet pipe, said body also having an outlet opening 8 constructed for attachment to an outlet or flush pipe. An inlet chamber 9 is formed in the valve body, such chamber being separated from and normally closed with respect to an outlet chamber 10 communicating with the outlet opening 8, said separating means consisting of a wall 11 preferably of cylindrical form and projecting into the inlet chamber 9. A valve seat is formed on the end of the wall 11.

At suitable intervals about the body relief passages 12 are formed, in the structure shown in Fig. 1 there being three of these relief passages, one being shown in the dotted outline, each of said passages having relief outlet openings 13 into the outlet opening 8, and as shown in Fig. 1.

A diaphragm 14 is seated upon the edge of the body surrounding the inlet chamber, this diaphragm having a single relief hole 15 that is adapted to register with either of the relief passages 12, depending upon the position in which the diaphragm may be placed. A valve support 16, composed of any suitable material, preferably metal, is secured to the diaphragm 14, said support having a groove for a valve packing 17 that is adapted to seat upon the wall 11 and thereby close the opening into the outlet chamber 10, said valve being held in place as by a clamp plate 18 secured at one end of a post 19, that projects through the support 16 and as shown in Fig. 1 of the drawings, and has a diaphragm clamp 20 secured thereto as by means of interengaging screw threads. This plate serves to clamp the diaphragm 14 between said plate and the support 16, thereby securing said parts to the diaphragm and to each other. An equalizing port 21 is formed through the support 16 and plate 20, flow of liquid through said port being controlled by an equalizing screw 22 fitting the screw threaded walls of said port and having an end 23 shaped to fit the shaped lower end of the port 21, said screw also having a cut away portion 24 extending lengthwise along its side.

A quick closing valve 25 is located in an opening 26 in the support 16 and preferably on the diametrically opposite side of said support from the equalizing port 21. This valve 25 is spring seated and serves to close an opening from the inlet chamber 9 to the pressure chamber 27 within a cap 28 that is secured to the valve body 6, as by means of screws or other suitable fastenings. The valve 25 has a stem 29 projecting within the chamber 27, the end of said stem, when the diaphragm is in position to seat the valve 17, being spaced a slight distance from the wall of the cap, or a projection 30 thereon.

In order to obtain a proper balance of pressures on the surfaces on opposite sides of the diaphragm as well as to obtain other results without enlarging the outer dimensions of the valve, the upper edge of the wall of the inlet chamber 9 is relieved or cut away as at 31.

The cap 28 has a valve adjusting opening 32 located opposite the equalizing screw 22 and closed by any suitable closure as a screw 33. By means of this opening an instrument may be readily inserted for access to the screw 22 for adjusting or other purposes. The post 19 projects into a recess 34 in the cap, this recess serving as a bearing for the post. A relief fixture 35 is secured in an opening in one edge of the cap 28, as shown in Figure 1 of the drawings, this fixture having an opening for the stem 36 of a relief valve 37 adapted to close a main relief port 38 in the fixture. A relief groove 39 extends around the fixture and communicates by means of auxiliary relief ports 40 with the main relief port 38. A communicating relief opening 41 is formed in the cap to establish a passage between the relief groove 39 and either of the relief passages 12. The relief valve 37 is spring seated and a take-up plunger 42 is located in a recess in the outer end of the stem 36, said plunger being seated upon a spring and adapted to press against the cam end 43 of an actuating lever 44. A housing 50 is secured to the fixture, as by means of interengaging screw threads, this housing having a lipped opening 51 through which the lever 44 extends and against the lip of which the cam end 43 acts.

By means of this take-up plunger any looseness between the stem 36 and the cam end 43 of the lever 44 is avoided, which looseness might be occasioned by wear or which might take place from other conditions.

The general shape of the structure, when viewed from the bottom as the device appears in Figure 1, is round, the passages 12 each being formed in a rib or projection extending along the side of the body. There being a single relief hole 15 in the diaphragm 14, as hereinbefore mentioned, and the fastenings for the cap being such that the latter and the diaphragm carried thereby may be placed in any position with the hole 15 directly overlying either of the relief passages 12, when thus placed the remaining relief passages will be closed at their upper ends, thus constituting such passages as air pockets. This causes such pockets to act as cushioning or relief chambers for back pressure that may be created in the outlet chamber 10 or outlet passage and prevent such back pressure from exerting unfavorable action on the movement of the diaphragm such as impeding its closing movement or creating unsteady movement thereof. An object in placing the cap in different positions, as indicated in dotted lines in Figure 2, is to enable ready access to be had to the handle 45 for manipulation of the valve, and also to enable said handle to be freely swung from side to side without interference as by contact with a wall or other object. It will be noted that when the cap is placed in any position the diaphragm and the cap parts are carried with the cap, so that the same relative positions of the cap and cap parts are always maintained.

The structures shown in Figures 3 and 4 are generally the same as the structure of Figure 1, the exception being that a single relief passage 12 is employed, and the body 6 in the structure of Figure 3 is provided with an annular groove 46 with which the hole 15 communicates. This enables the cap to be placed in any angular position with respect to the body and to be secured as by means of an annular locking member 47 capable of engaging the cap and body, and as shown in Figure 3 of the drawings. In the structure of Figure 4 the same fastening means between the cap and body are employed, but a series of holes 48 are formed in the diaphragm and quite close together, and a groove 49 is formed in the lower edge of the cap 28 instead of in the upper edge of the body, as in Figure 3. In both of the structures shown in Figures 3 and 4 the cap may be adjustably placed so that the handle 45 will assume substantially any angular position with respect to the cap, and as shown in dotted lines in Figure 5 of the drawings.

In its normal position of rest, the parts of the valve being in the position indicated in Figure 1 of the drawings, the packing 17 is seated against the upper edge of the wall 11 and the valve is "closed". Now if the handle 45 be swung in any direction the relief valve 37 is opened, establishing communication between the pressure chamber 27 and the outlet 8, thereby reducing the pressure in said pressure chamber to a point below that in the inlet chamber 9. This causes the diaphragm to be moved and carry the packing 17 away from its seat, thus permitting the liquid to flow directly from the chamber 9 through the outlet chamber 10 and outlet 8 for flushing purposes.

The handle 44 being now released the spring appurtenant to the valve 37 aided by the pressure will close the latter and the outlet from the chamber 27, with the exception of that controlled by the valve 25. This causes the pressure to build up in the chamber 27, thereby moving the diaphragm toward its normal position of rest. When the diaphragm was moved from its seat the end of the stem 29 was carried against the projection 30, and this opened the valve 25, and said valve being opened remains in this condition until the diaphragm begins to move towards its seat. This results in a comparatively rapid initial movement of the diaphragm which, when near its seat, moves the stem 29 away from the projection 30, thus retarding the movement of the diaphragm that as a consequence settles easily and presses the packing 17 into contact with the upper edge of the wall 11, thereby eliminating objectionable noise that would otherwise be caused by "water hammer."

It will be noted that the valve 37 is located at such distance above the diaphragm as to provide a reservoir for the retention of water in the chamber 27. This chamber always being filled to this extent shortens the time required to complete the filling and thereby create pressure therein to force the diaphragm down, and the time of action of said diaphragm is correspondingly shortened.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A flush valve body having an inlet and an outlet chamber with a communicating passage between them, said body also having a cushioning chamber opening inwardly from said outlet chamber and closed at its inner end, a diaphragm overlying said passage, a valve carried by said diaphragm to control said passage, a cap overlying said diaphragm, means for relieving the pressure in said pressure chamber and means for directing said pressure through said diaphragm into said cushioning chamber.

2. A flush valve body having an inlet and an outlet chamber with a communicating passage between them, a diaphragm overlying said passage, a cap secured to said body and having a pressure chamber, a valve support secured to said diaphragm and having a quick closing port therethrough, a valve packing carried by said support, and a valve controlling said port and operating by reason of movement of said diaphragm to close the port as said valve packing nears its seat.

3. A flush valve body having an inlet and an outlet chamber with a communicating passage between them, a diaphragm overlying said passage, a cap secured to said body and containing a pressure chamber, a valve support secured to said diaphragm and having a quick closing port, a valve to control said port and having an extension to make contact with an immovable part of the structure for operation of the valve as the diaphragm is moved, a valve packing carried by said support, and means for relieving the pressure in said pressure chamber.

4. A flush valve body having an inlet and an outlet chamber with a communicating passage between them, a cap secured to said body and having a pressure chamber, a diaphragm extending across the body and overlying the inlet chamber, a support carried by said diaphragm and having a quick closing opening, a spring within said opening, a quick closing valve seated upon said spring to control a quick closing port through said support into the pressure chamber, a stem projecting from said valve to make contact with said cap for operation of the valve as the diaphragm is moved, a valve packing secured to said support, and means for relieving pressure in said pressure chamber.

5. A flush valve body having an inlet and an outlet chamber with a communicating passage between them, a cap secured to said body and having a pressure chamber, a diaphragm extending across the body between said pressure and inlet chambers, a valve support secured to said diaphragm and having an equalizing port and a quick closing port, an equalizing member to control said equalizing port, a quick closing valve operated by the movement of the diaphragm to control said quick closing port, a valve packing carried by said valve support, and means for relieving pressure in said pressure chamber.

6. A flush valve body having an inlet and an outlet chamber with a communicating passage between them, a cap secured to said body and having a pressure chamber, a diaphragm extending across the body between said inlet and pressure chambers, a valve support secured to said diaphragm, an equalizing port extending through said valve support and containing an equalizing port controlling member, a quick closing port extending through said valve support and containing a quick closing valve to control said port, an opening in said cap overlying said equalizing port, means for closing said opening, a projection from said cap to engage an extension from said quick closing valve to retard its movement as the diaphragm is moved, means for seating said quick closing valve, a valve packing secured to said valve support, and means for relieving pressure within said pressure chamber.

7. A flush valve body having an inlet and an outlet chamber with a communicating passage between them, a cap secured to said body and having a pressure chamber, a diaphragm extending across said body between said inlet and pressure chambers, a valve carried by said diaphragm to control said communicating passage, means for securing the cap to the body in various definite angular positions, said cap and body having communicating pressure releasing passages constructed to register in any position of the cap with respect to the body, and means including a swinging handle for controlling the passages between said pressure and outlet chambers.

8. A flush valve body having an inlet and an outlet chamber and relief passages communicating with the outlet chamber, a diaphragm extending across the body and overlying said inlet chamber, a cap having a pressure chamber, means for securing the cap to the body in different angular positions, said cap having a relief port constructed to register with one of said relief passages in any position of the cap, and means including a swinging handle for controlling the pressure in said pressure chamber.

9. A flush valve body having an inlet and an outlet chamber with a communicating passage between them, a diaphragm overlying said passage, a cap secured to said body and having a pressure chamber, means carried by the diaphragm and having a movement controlled by the action thereof to increase pressure in said pressure chamber and accelerate closing movement of the valve, and means for initially relieving pressure in said pressure chamber.

10. A flush valve body having an inlet and an outlet chamber with a communicating passage between them, a diaphragm overlying said passage, a valve carried by said diaphragm to control said passage, a cap having a pressure chamber, and means for relieving the pressure in said pressure chamber, said body having a plurality of cushioning chambers communicating with said outlet chamber.

11. A flush valve body having an inlet and an outlet chamber with a communicating passage between them, said body also having a plural number of relief passages opening into said outlet chamber, a diaphragm overlying said communicating passage and having a hole to register with said relief passages, said diaphragm closing the upper ends of some of said relief passages to create cushioning chambers thereof, a valve carried by said diaphragm to control said communicating passage, a cap having a pressure chamber, and means for opening said pressure chamber to one of said relief passages.

12. A flush valve body having an inlet and an outlet chamber with a communicating passage between them, a diaphragm overlying said passage, a cap secured to said body and having a pressure chamber, means for securing said cap in different rotatable positions, a valve support secured to said diaphragm and having an equalizing port at one side of the center of said diaphragm, an equalizing member within said port, a valve adjusting opening through said cap and located the same distance from the center of said cap that said member is from the center of said diaphragm, a valve packing carried by said support, means for holding the valve against the support and for guiding the valve and means for relieving the pressure in said pressure chamber.

13. In a flush valve, a casing, a diaphragm extending transversely of the casing to divide the latter into at least three chambers and a plurality of valves carried by said diaphragm, one of said valves being caused to move with respect to the diaphragm due to the movement of the latter with respect to the casing.

14. In a flush valve, a casing, a diaphragm extending through the casing to divide the latter into at least three compartments, three valves carried by the diaphragm, and means for causing one of said valves to move in opposite directions with respect to the diaphragm due to movement of the latter with respect to the casing.

15. In a flush valve, a casing, a flexible diaphragm extending through the casing to divide the same into a plurality of compartments, two valves carried by the diaphragm to move therewith but remaining fixed with respect to the diaphragm, and a third valve carried by the diaphragm and automatically moved in opposite directions with respect thereto during movement of the diaphragm.

16. In a flush valve, a casing, a diaphragm dividing the casing into at least two chambers, two valves carried by the diaphragm, one of which controls a constantly open communication between two chambers while the other valve is seated and unseated by the movement of the diaphragm, and a third valve fixed with respect to the diaphragm to move therewith for controlling communication between two chambers.

GORDON W. WHITE.